Oct. 9, 1945.　　　　E. W. CLEMENTS　　　2,386,293
ADJUSTABLE PRESSURE RELIEF VALVE
Filed Aug. 12, 1942
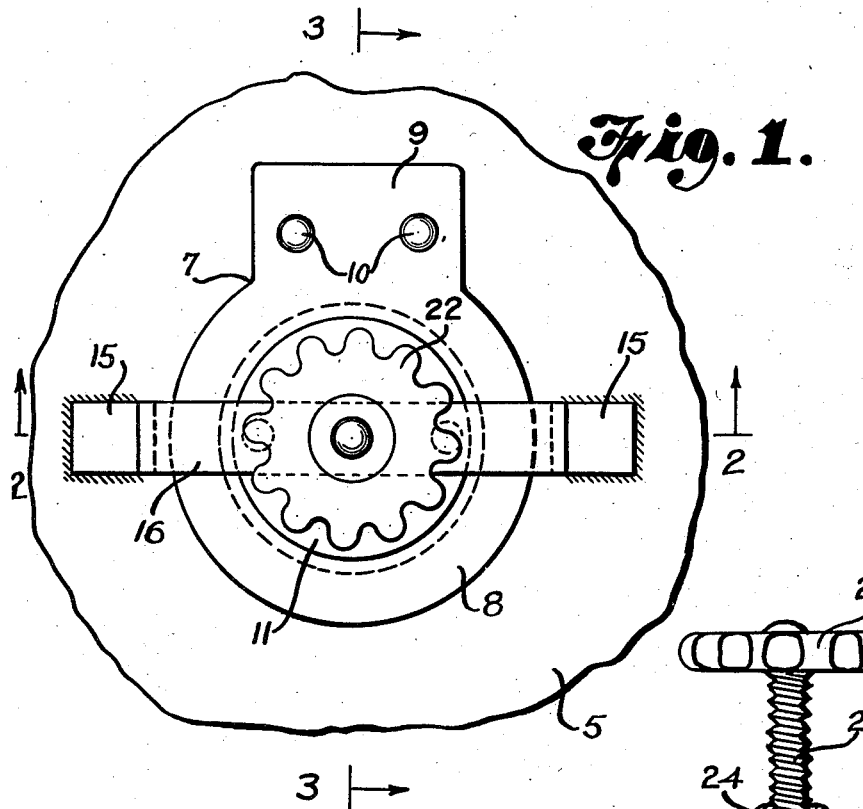
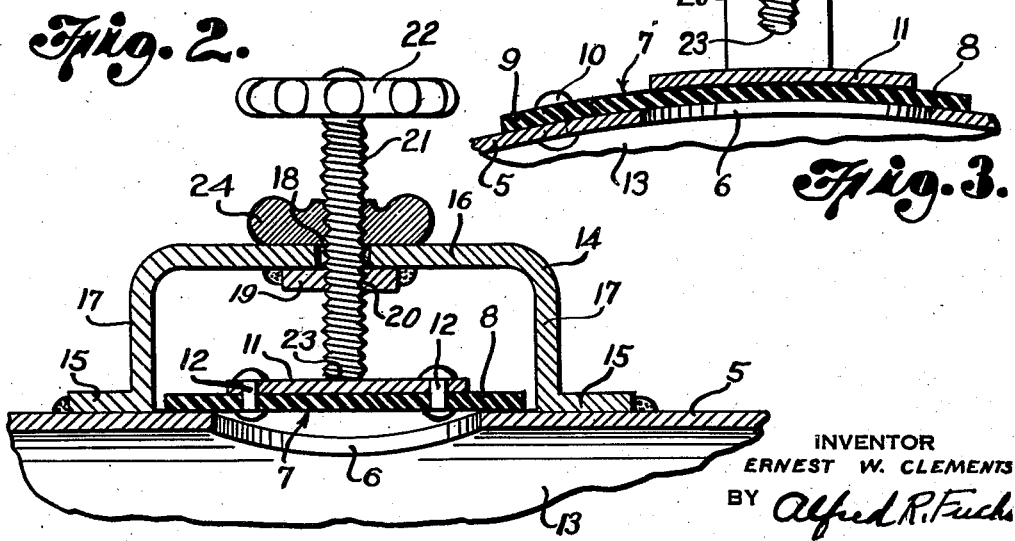
INVENTOR
ERNEST W. CLEMENTS
BY
ATTORNEY Patented Oct. 9, 1945

2,386,293

UNITED STATES PATENT OFFICE 2,386,293

ADJUSTABLE PRESSURE RELIEF VALVE

Ernest W. Clements, Kansas City, Kans., assignor to Andrew A. Kramer, Kansas City, Mo.

Application August 12, 1942, Serial No. 454,551

3 Claims. (Cl. 137—53)

My invention relates to adjustable pressure relief valves, and more particularly to such a valve adapted for controlling maximum pressures in a respirator. This application is a continuation-in-part of my application Serial No. 319,091, filed February 15, 1940, for patent on Respirator.

It is a purpose of my invention to provide a valve for controlling the maximum pressure in a chamber that is connected with pumping means for alternately increasing and decreasing the pressure therein, which is simple in construction and which can be adjusted readily and will remain in adjusted position without any possibility of the same becoming out of adjustment, the adjusting means being of a self-locking character.

It is a particular purpose of my invention to provide a valve of the above mentioned character, that comprises a flap valve member, which is provided with means for normally opening the same to relieve the pressure within a chamber at a definite maximum pressure, this being accomplished by means of a weight provided on said flap valve, but which is adapted to be adjusted so as to clamp the valve member down on its seat, so as to prevent opening thereof at said maximum pressure.

It is a further purpose of my invention to provide a valve of the above mentioned character, which has means for adjusting the same, so that the amount of opening of the valve, after the maximum pressure has been reached that opens the same, can be adjusted to control the rate of discharge of air from the chamber through said pressure relief valve, to thereby control the pressure rise during the pressure increasing stroke of the pumping means in a desired manner to imitate the breathing action of the patient within a respirator chamber, by means of the pressure changes therein, more accurately than would otherwise be possible. The valve can thus be adjusted to prevent sudden pressure drops upon opening of the valve or can be adjusted so that the pressure will increase slightly after the valve opens, or that the pressure will increase considerably after the valve opens, as may be desired for the particular patient in the respirator.

It is a particular purpose of my invention to provide a valve of the above mentioned character, that is simple in construction, employs a very small number of parts, and is so constructed and arranged that the operating parts are readily visible to an observer, so that if any lack of proper functioning of the valve exists it can be readily noted. Furthermore my improved valve is so constructed that it is sturdy and that the valve member itself is protected from possible damage or interference with the operation thereof by outside means, and in which the weight comprises a plate-like member that also acts as a bearing plate for a screw-threaded adjusting member for clamping the valve to its seat and for engagement with said screw-threaded member when the same serves as an adjustable stop for limiting the opening movement of the valve.

Other objects and advantages of my invention will appear as the description of the drawing proceeds. I desire to have it understood, however, that I do not intend to limit myself to the particular details shown or described, except as defined in the claims.

In the drawing:

Fig. 1 is a fragmentary top plan view of a portion of a chamber, such as a respirator chamber, showing my improved valve applied thereto.

Fig. 2 is a fragmentary section taken on the line 2—2 of Fig. 1, showing the valve clamped in sealing position on the seat, and Fig. 3 is a fragmentary section taken on the line 3—3 of Fig. 1, showing the valve adjusted so as to open a predetermined amount upon the maximum pressure for lifting the valve being reached.

Referring in detail to the drawing, a portion of a chamber is shown therein, which is usually a respirator chamber, or chamber for receiving the body of a patient to induce breathing by pressure changes in said chamber. Only a fragmentary portion of the top of the chamber is shown, the top wall 5 having an opening 6 therein, which the pressure relief valve, forming the subject matter of this invention, is adapted to close. Said valve comprises a flap member 7, which has a substantially circular body portion 8, and a lateral rectangular extension 9, said flap member being made of rubber or similar flexible sealing material of a compressible character. The lateral extension 9 of said flap valve member is fixed to the chamber wall 5 by any suitable securing elements, such as the headed elements 10, so as to be firmly clamped thereto. The circular body portion 8 overlaps the opening 6 on all sides thereof, the portion of the wall 5 surrounding the opening 6 serving as a seat for the valve.

Fastened so as to be arranged concentrically to the circular body portion 8 of said flap valve member 7, is a reenforcing plate 11, the same being shown as being secured in fixed position on the flap valve member 7 by means of headed securing elements 12. The reenforcing plate 11 serves not only as reenforcing means for the valve, but also as a weight, which controls the pressure at which the flap valve will open. It will be noted that the weight or reenforcing member 11 is of very slightly smaller diameter than the opening 6, thus tending to provide snug engagement between the compressible material of the flap valve member and the edge of the seat provided at the rim of the opening 6.

The pressure relief accomplished by the flap valve is determined not only by the pressure at which it opens, but the amount the same opens when sufficient pressure above atmospheric pressure within the chamber 13, of which the wall 5 is one of the walls, has been developed. The amount of opening of the valve 7 is controlled by means of adjustable stop means. Said adjustable stop means comprises a yoke-like member 14 forming a bracket, which is secured in fixed position on the body portion of the chamber by securement to the wall 5, this being accomplished by welding the flanges or feet 15, provided on said yoke-like member, to said wall 5, as clearly shown in Fig. 2. Said yoke-like member has a transversely extending portion 16 spaced from the wall 5, extending across the opening 6 and thus bridging the valve member 7 to protect it and to act as a mounting for the adjusting means, said transverse portion being spaced from the feet 15 by means of the parallel leg portions 17 thereof extending away from the wall 5 connecting said feet 15 with the transverse portion 16. Said yoke-like bracket member 16 is provided with an opening 18 therein that aligns with the center of the disk-like reenforcing member 11 and the center of the circular body portion 8 of the valve and the opening 6.

Secured in fixed position on the under side of the transverse portion 16 of said yoke-like member is a member 19, which is shown as being welded to the transverse portion 16 of the member 14 and which is provided with an internally screw-threaded opening 20, said member being, preferably, an ordinary nut welded to the member 16, as clearly shown in Figs. 2 and 3. The screw-threaded opening 20 in said member 19 is, preferably, co-axial with the opening 18 in the member 16. Cooperating with said screw-threaded member 19 is the screw-threaded shank or stem portion 21 of the adjusting member for the valve, which is provided with means for turning the same, such as a hand wheel 22. The end 23 of the shank is adapted to be either spaced from the plate 11, as shown in Fig. 3, or in engagement therewith, as shown in Fig. 2.

By adjusting the valve to the position shown in Fig. 2, the flap valve will be held tightly closed and this will develop the maximum pressure possible above atmospheric pressure in the chamber within the wall 5. Adjustment of the member 21 upwardly from the position shown in Fig. 2 will, of course, increase the opening of said flap valve when the pressure is sufficient to raise the same off its seat on the wall 5. The opening 6 can thus be sealed entirely by clamping the flap valve member down on the seat provided by the wall 5 adjacent the opening, so that it will not open under any pressure conditions developed within the chamber 13. When in this position the plate 11 serves as pressure distributing means to distribute the pressure evenly around the body portion of the flap valve where the same engages with the wall 5 surrounding the opening 6, and will also serve as a wear plate, or bearing means to prevent any wear on the valve by clamping action of the screw 21 exerted by means of the hand wheel 22. When the valve is in a closed position with the end 23 of the screw 21 spaced from the plate 11, the amount of opening of said valve when the pressure at which opening of the valve occurs is reached, can be definitely predetermined. A very fine adjustment of said stop member can be obtained by means of the screw-threaded connection between the stem or shank 21 and the screw-threaded member 19. Also, due to said screw-threaded connection, a self-locking stop means is provided, so that when once the stop means is adjusted, it will remain so until again adjusted by the operator of the device and will not accidentally move out of position, so as to change the adjustment of the valve opening under pressure. A lock nut 24 for additional safety against moving the stop out of adjustment can be provided if desired.

It will be obvious from the above that a valve member that is highly capable of accomplishing the purpose of this invention is provided, which at the same time is very simple and cheap in construction and yet is sturdy and is so constructed that there is little possibility of the same being damaged in use.

What I claim is:

1. A pressure relief valve for a chamber comprising a flap member of flexible sheet material having a lateral extension secured in fixed position to a wall of said chamber adjacent an opening therein, said valve having a substantially circular body portion overlapping said opening and seating face to face on the outer face of said wall adjacent said opening to seal said opening, a disk-like metal plate slightly smaller than said opening fixed substantially centrally to said body portion on the outer face thereof, a bracket fixed to said wall and having a transverse portion offset from said wall, a screw-threaded stem having means thereon for rotating the same, and means on said transverse portion of said bracket providing a screw-threaded connection between said steam and said bracket, said stem being adjustable to move the same into clamping engagement with said plate or into a predetermined spaced relation to said plate in the closing position of said valve to determine the amount said valve will be raised off its seat upon opening responsive to pressure in said chamber, said plate providing a weight for normally seating said valve, all parts of said valve lying externally of said chamber.

2. A pressure relief valve for a chamber comprising a flap member of flexible sheet material having a lateral extension secured in fixed position to a wall of said chamber adjacent an opening therein, said valve having a substantially circular body portion overlapping said opening and seating face to face on the outer face of said wall adjacent said opening to seal said opening, a disk-like metal plate slightly smaller than said opening fixed substantially centrally to said body portion on the outer face thereof, a bracket comprising a bar having a pair of end flanges fixed to said wall, a pair of parallel portions extending from said flanges away from said seat, and a transverse portion having an opening therein, a member fixed to said transverse portion having a screw-threaded opening aligning with the opening in said transverse portion, and a screw-threaded stem extending through said opening in said transverse portion and screw-threadedly engaging in said threaded opening having means thereon for rotating the same, said stem being adjustable to move the same into clamping engagement with said plate or into a predetermined spaced relation to said plate in the closing position of said valve to determine the amount said valve will be raised off its seat upon opening responsive to pressure in said chamber, said plate providing a weight for normally seating said valve, all parts of said valve lying externally of said chamber.

3. A pressure relief valve for a chamber having a convex outer face, comprising a flap member of flexible sheet material having a lateral extension secured in fixed position to a wall of said chamber adjacent an opening therein, said valve having a substantially circular body portion overlapping said opening and seating face to face on the outer face of said wall adjacent said opening to seal said opening, a disk-like metal plate transversely curved to substantially the curvature of the outer face of said chamber and slightly smaller than said opening fixed substantially centrally to said body portion on the outer face thereof, a bracket fixed to said wall and having a transverse portion offset from said wall, a screw-threaded stem having means thereon for rotating the same, and means on said transverse portion of said bracket providing a screw-threaded connection between said stem and said bracket, said stem being adjustable to move the same into clamping engagement with said plate or into a predetermined spaced relation to said plate in the closing position of said valve to determine the amount said valve will be raised off its seat upon opening responsive to pressure in said chamber, said plate providing a weight for normally seating said valve, all parts of said valve lying externally of said chamber.

ERNEST W. CLEMENTS.